United States Patent
Secondini et al.

(10) Patent No.: US 7,873,282 B2
(45) Date of Patent: Jan. 18, 2011

(54) SYSTEM, METHOD AND APPARATUS FOR POLARIZATION MODE DISPENSION COMPENSATION AND DEMULTIPLEXING POLARIZATION MULTIPLEXED SIGNALS

(75) Inventors: Marco Secondini, Rome (IT); Enrico Forestieri, Parma (IT); Giancarlo Prati, Parma (IT); Giulio Colavolpe, Parma (IT)

(73) Assignee: Ericsson AB, Stockholm (SE)

(*) Notice: Subject to any disclaimer, the term of this patent is extended or adjusted under 35 U.S.C. 154(b) by 705 days.

(21) Appl. No.: 10/598,718

(22) PCT Filed: Mar. 9, 2005

(86) PCT No.: PCT/EP2005/051061
§ 371 (c)(1),
(2), (4) Date: Dec. 12, 2007

(87) PCT Pub. No.: WO2005/086391
PCT Pub. Date: Sep. 15, 2005

(65) Prior Publication Data
US 2008/0159741 A1   Jul. 3, 2008

(30) Foreign Application Priority Data
Mar. 9, 2004   (IT)   ............. MI2004A0446

(51) Int. Cl.
H04B 10/18   (2006.01)
H04B 10/06   (2006.01)
(52) U.S. Cl. ............... 398/147; 398/159; 398/213
(58) Field of Classification Search ......... 398/147–148, 398/159, 205, 108–109, 213
See application file for complete search history.

(56) References Cited

U.S. PATENT DOCUMENTS 6,538,787 B1   3/2003   Moeller et al.
2003/0103723 A1   6/2003   Bohn et al.
2003/0175034 A1*   9/2003   Noe ............................. 398/152
2004/0208604 A1*   10/2004   Madsen ....................... 398/147
2005/0254749 A1*   11/2005   Bulow ........................... 385/27

FOREIGN PATENT DOCUMENTS

EP   0909045   4/1999
EP   1164724   12/2001

OTHER PUBLICATIONS

Vassallo, C.: "PMD Pulse Deformation." Electronics Letters, IEE Stevenage, GB, vol. 31, No. 18, Aug. 31, 1995, pp. 1597-1598, XP00600335. ISSN: 0013-5194.

* cited by examiner

Primary Examiner—Leslie Pascal
(74) Attorney, Agent, or Firm—Coats & Bennett, P.L.L.C.

(57) ABSTRACT

A polarization multiplex transmission system (10) comprises two optical signals ($z_1$, $z_2$) transmitted over the same optical fiber (15) at the same wavelength but with orthogonal polarizations. The system is characterized by receiving apparatus (10) which is operable to filter the two components with orthogonal polarization of the signal received in accordance with an appropriate transfer matrix which is dynamically controlled on the basis of the output signals in such a manner as to approximate the reverse transfer matrix of the fiber in the region of the spectrum occupied by the signal so as to compensate for Polarization Mode Dispersion (PMD) and polarization rotation introduced by the fiber and eliminating distortion and mutual interference effects for both the signals and thereby obtain a demultiplexed output corresponding to the two transmitted signals.

27 Claims, 3 Drawing Sheets

SYSTEM, METHOD AND APPARATUS FOR POLARIZATION MODE DISPENSION COMPENSATION AND DEMULTIPLEXING POLARIZATION MULTIPLEXED SIGNALS

The present invention relates to the field of demodulation techniques for optical communication systems and in particular although not exclusively to demodulation of polarization multiplexed signals.

As is known polarization multiplexing (PolMUX) allows the transmission at the same carrier wavelength in the same optical fibre of two orthogonally polarized optical signals, thus doubling the spectral efficiency. In this manner it is possible to double the amount of data transmitted in a unit of time whilst occupying the same wavelength band.

With reference to a Wavelength Division Multiplexing (WDM) system, the use of PolMUX can be viewed from two perspectives: the first being a 4-level transmission system allowing a doubling of the transmission rate per wavelength channel without changing the transmitted symbol speed (for example a 40 Gbit/s channel can be transmitted in the form of two 20 Gbit/s orthogonally polarized optical signals), and the second a method of doubling the number of WDM channels without changing (reducing) the wavelength channel spacing.

Although promising, PolMUX presents considerable practical difficulties in implementing it in optical communications system. For example it is known that an optical signal which is transmitted over an optical fibres undergoes random time-varying rotation to its state of polarization. As a result the state of polarization of the received optical signal is subject to random time-varying rotation. Although this phenomenon will not affect the orthogonality of the two polarization multiplexed signals it will affect the orientation with the orthogonal states of polarization are presented to the receiver thus making their separation impossible without an appropriate dynamic polarization tracking technique.

Moreover, in the case of high-speed symbol transmission systems, Polarization Mode Dispersion (PMD) will widen, distort and depolarize the transmitted pulses and cause considerable deterioration in the quality of the received signal. PMD can also give rise to mutual interference and mixing of the two orthogonal polarization signals.

The present invention arose in an endeavour to at least in part remedy the above mentioned shortcomings and provides a system that allows simultaneous PMD compensation and demultiplexing of polarization multiplexed signals.

In accordance with a first aspect of the invention there is provided a transmission system comprising two optical signals transmitted over the same fibre at the same wavelength but with orthogonal polarization and characterised by receiving apparatus capable of filtering the two components with orthogonal polarization of the signal received in accordance with a transfer matrix which is controlled dynamically on the basis of the output signals in such a manner as to approximate the reverse transfer matrix of the fibre in the region of the spectrum occupied by the signal so as to compensate for the PMD and the polarization rotation introduced by the fibre and eliminating distortion and mutual interference effects for both the signals and obtaining at output an approximate repetition of the two signals transmitted.

In accordance with a second aspect of the invention there is provided a transmission method comprising two optical signals transmitted over the same fibre at the same wavelength but with orthogonal polarization and characterised by at the receiving side filtering the two components with orthogonal polarization of the signal received according to a transfer matrix and dynamically controlling the transfer matrix on the basis of the signals output in such a manner as to approximate the reverse transfer matrix of the fibre in the region of the spectrum occupied by the signal so as to compensate for the PMD and the polarization rotation introduced by the fibre while eliminating distortion and mutual interference effects for both the signals and obtaining at output an approximate repetition of the two signals transmitted.

In accordance with a further aspect of the invention there is provided an apparatus for receiving an polarization multiplexed optical signal transmitted over a fibre and made up of two polarization multiplexed signals and to perform simultaneous compensation of the polarization mode dispersion (PMD) and demultiplexing of the two signals and characterised by means which filter the two orthogonal polarization components of the signal received according to a transfer matrix which is controlled dynamically on the basis of the signals output in such a manner as to approximate the reverse transfer matrix of the fibre in the region of the spectrum occupied by the signal so as to compensate for the PMD and the polarization rotation introduced by the fibre while eliminating distortion and mutual interference effects for both the signals and obtaining at output an approximate repetition of the two signals transmitted.

In order that the invention can be better understood embodiments in accordance with the invention will now be described by way of example only with reference to the accompanying drawings in which.

Figure 1:
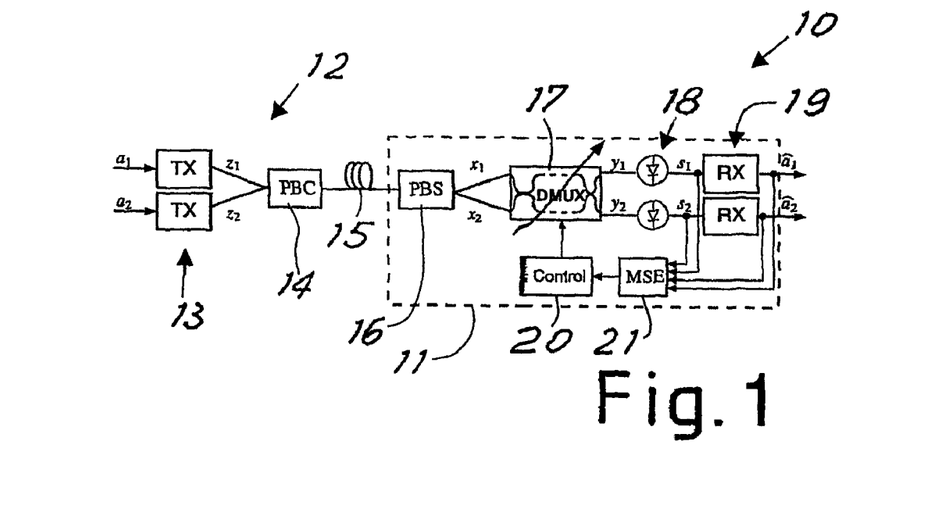
FIG. 1 is a block diagram of a polarization multiplexing transmission system in accordance with the invention.

Referring to FIG. 1 there is shown a Polarization multiplexing transmission system (designated as a whole by reference number 10) in accordance with the invention. In particular, the dashed-line rectangle 11 shows the receiver stage in accordance with the invention for simultaneously compensating for polarization mode dispersion and demultiplexing the received polarization multiplexed optical signal.

At the transmitter end 12, two independent bit streams $a_1$ and $a_2$ are applied to two respective transmitters TX 13 which produce corresponding intensity modulated optical signals $z_1$ and $z_2$ with the same carrier wavelength $\lambda$. The transmitter 13 conveniently comprises a single laser for generating the optical carrier, an optical splitter for splitting the laser light and a respective optical modulator for modulating light from the laser with the bit streams $a_1$ and $a_2$. The two modulated optical signals $z_1$ and $z_2$ of carrier wavelength $\lambda$ are combined such that their respective states of polarization are orthogonal to one another by a Polarization Beam Combiner (PBC) 14 and the polarization multiplexed signal transmitted through an optical fibre 15 to the receiving stage 11.

In the receiver 11 the received polarization multiplexed signal is separated into two orthogonal components by a Polarization Beam Splitter (PBS) 16 whose axes are arbitrarily oriented. The two separated components $x_1$ and $x_2$ are applied to a respective input port of a demultiplexing (DMUX) device 17 to produce components $y_1$ and $y_2$ at respective output ports of the device. The DEMUX device 17 will be described in detail below and can be fabricated in the form of a Planar Lightguide Circuit (PLC) or as a cascade of discrete components such a Polarization Controllers and Polarization Maintaining Fibres.

As will be shown, by appropriate configuring and control of the filtering function of the DEMUX device 17 the two output components $y_1$ and $y_2$ correspond to the two transmitted signals $z_1$ and $z_2$ appropriately equalized and demultiplexed to compensate for the effects of the propagation through the fibre 15.

The components $y_1$ and $y_2$ are detected by a respective photodetector 18 to produce corresponding electrical signals $s_1$ and $s_2$ which are input to known receiver (RX) 19. The receivers 19 produce respective output signals $\hat{a}_1$ and $\hat{a}_2$ which by appropriate configuration and control of the DMUX-will correspond to the original bit stream signals $a_1$ and $a_2$. The receivers 19 for the two channels can be completely separate or share some elements such as the clock recovery circuit.

As will be clarified below, the DMUX device 17 is advantageously adaptively controlled by continually updating the value of its control parameters on the basis of a feedback signal derived from the signals $s_1$, $s_2$, $\hat{a}_1$ and $\hat{a}_2$. A control circuit 20 controls the DMIUX device control parameters on the basis of a feedback signal which is generated by a block 21 which calculates said signal on the basis of the characteristics of the signals $s_1$, $s_2$, $\hat{a}_1$ and $\hat{a}_2$. An advantageous realization of the feedback control arrangement is explained below.

Figure 2:
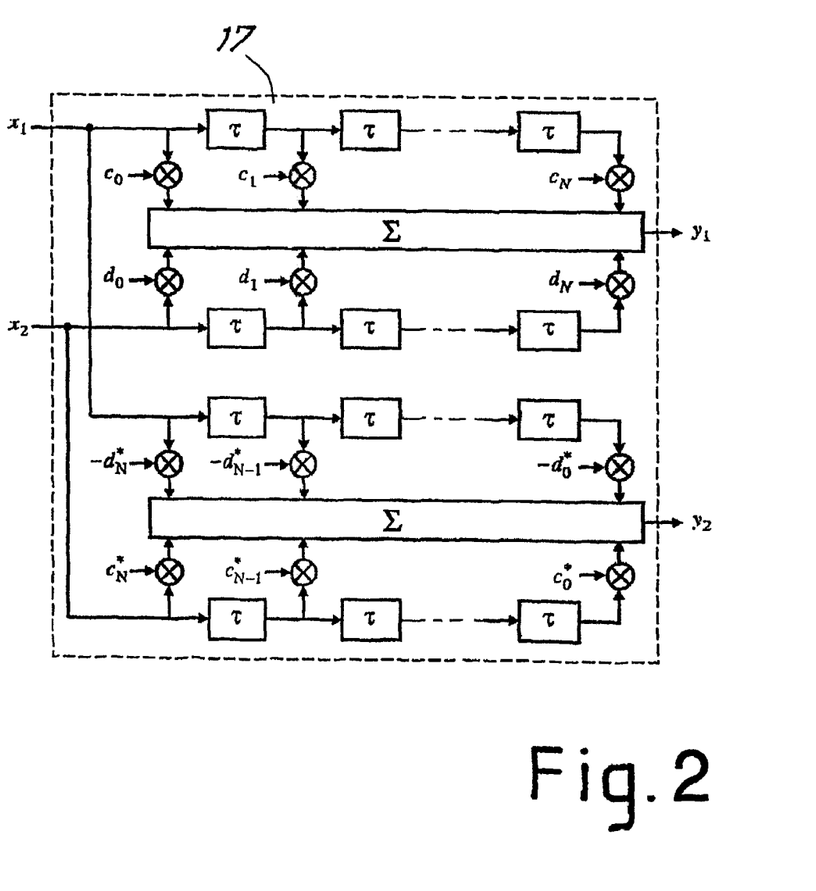
FIG. 2 is a functional block diagram of the demultiplexing DMUX apparatus of FIG. 1 as a combination of transversal filters with complex coefficients.

FIG. 2 shows a functional diagram of the demultiplexing DMUX device 17 by means of a combination of a plurality N of transverse filters with complex coefficients that are indicated below as two-dimensional filters. The DMUX device 40 has transfer function $H(\omega)$ given by:

$$H(\omega) = e^{-j\frac{N}{2}\omega\tau} \begin{pmatrix} C(\omega) & D(\omega) \\ -D^*(\omega) & C^*(\omega) \end{pmatrix} \quad (1)$$

The two functions $C(\omega)$ and $D(\omega)$ can be represented by means of their Fourier series expansion (N+1 terms):

$$C(\omega) = \sum_{k=0}^{N} c_k e^{-j(k-N/2)\omega\tau} \quad (2)$$

$$D(\omega) = \sum_{k=0}^{N} d_k e^{-j(k-N/2)\omega\tau} \quad (3)$$

where $c_k$ and $d_k$ are complex coefficients. It is known that such filters have periodic transfer functions, with a period $1/\tau$, whose course can be controlled by appropriately changing the coefficients. The only limits are set by the periodicity of the transfer functions and the finite number, N+1, of harmonics representing them. In addition, to have a unitary transfer matrix there is the additional constraint that:

$$|C(\omega)|^2 + |D(\omega)|^2 = 1 \quad (4)$$

Figure 3:
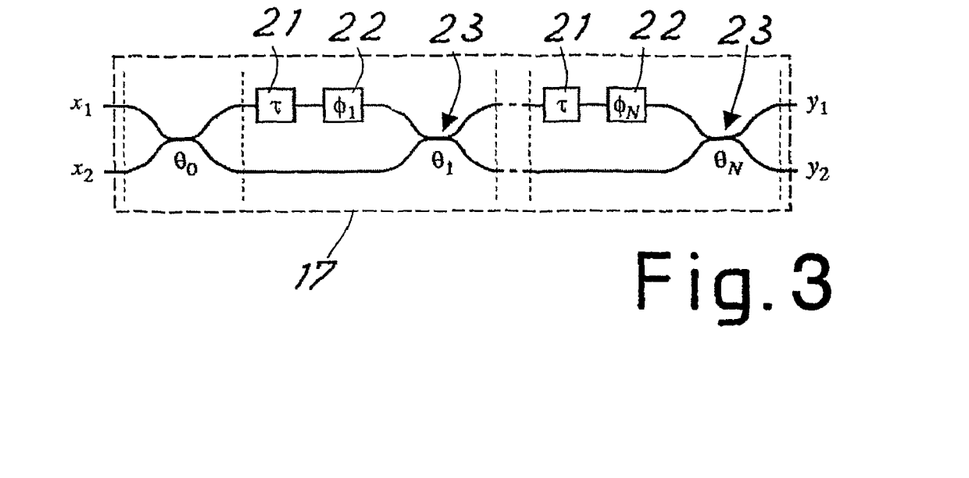
FIG. 3 is a practical implementation of the DMUX apparatus of FIG. 2 implemented in the form of a Planar Lightguide Circuit (PLC)

FIG. 3 shows a schematic representation of a possible implementation of the DMUX device 17 that is implemented as a Planar Lightguide Circuit (PLC). The device 17 is a 4-port device, two input and two output ports, and comprises a cascade of N identical filtering elements. Each element comprises an interferometric structure which includes within the first optical path: a delay line 21 which introduces a delay $\tau$ to optical signals passing along the first path relative to the second path and a phase modulator 22 controlled by a parameter $\phi_n$ (where n=1 to N). Each filtering element further comprises a variable coupler 23 controlled by a parameter $\theta_n$ for coupling optical signals from the first and second paths. At the input of the device 17 there a further variable coupler $\theta_0$ is provided. Implementation of each of the components within the DMUX device will be readily imaginable to one skilled in the art, and can comprise for example a Mach-Zehnder interferometer type structure. The total number of controllable parameters is Q=2N+1 which is the number of degrees of freedom of the device 17. To enhance the dynamic functioning of the device it is also possible that some, or all, of the N elements of the device include a larger number of phase modulators 22 and variable couplers 23 to increase the number of degrees of freedom of the device. The overall transfer matrix of the device can be calculated by multiplying the transfer matrices of the individual elements. In particular, by omitting an unessential delay phase term, the transfer matrix of the variable coupler $H_{\theta_n}$, phase modulator $H_{\phi_n}$ and delay line $H_\tau(\omega)$ are respectively:

$$H_{\theta_n} = \begin{pmatrix} \cos\theta_n & -j\sin\theta_n \\ -j\sin\theta_n & \cos\theta_n \end{pmatrix} \quad (5)$$

$$H_{\phi_n} = \begin{pmatrix} e^{j\phi_n/2} & 0 \\ 0 & e^{-j\phi_n/2} \end{pmatrix}$$

$$H_\tau(\omega) = \begin{pmatrix} e^{-j\omega\tau/2} & 0 \\ 0 & e^{j\omega\tau/2} \end{pmatrix}$$

Accordingly, the overall transfer matrix $H(\omega)$ for the DEMUX device 17 is given by:

$$H(\omega) = \left[\prod_{n=N}^{1} (H_{\theta_n} H_{\phi_n} H_\tau(\omega))\right] H_{\theta_0} \quad (6)$$

It can be shown that the transfer matrix (6) is a frequency-dependent unitary transfer matrix that can be written in the same form indicated by equations (1) to (4). Accordingly, the PLC (Planar Lightguide Circuit of FIG. 3) device realizes the functionality requested of the DMUX 17 device. In practice, it is necessary to allow for the fact that the control parameters will not be directly the complex coefficients of the transverse filter but the Q parameters of the PLC linked thereto non-linearly. This does not present a problem for realization of the present invention.

Figure 4:
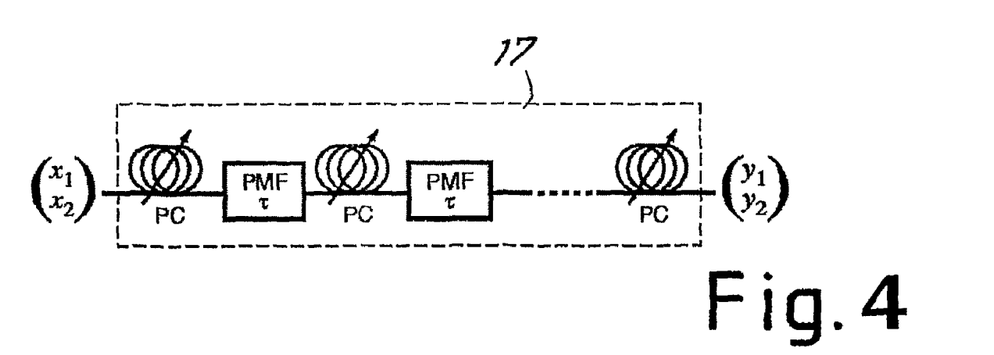
FIG. 4 shows another possible implementation of the DMUX of FIG. 2 using Polarization Controllers (PC) and Polarization Maintaining Fibres (PMF)

FIG. 4 illustrates an alternative implementation of the DMUX 17 using cascaded polarization controllers (PC) and polarization maintaining fibres (PMF).

From a systems theory viewpoint the description of this device is identical to that of the PLC device of FIG. 3. The above equations (5) and (6) and the deriving consequences are thus equally valid considering that to spatial separation of the input and output signals of the PLC correspond in this case a polarization separation and that the PBS at the input of the DMUX device in FIG. 1 must be shifted to the output of the apparatus.

The operating principle of the DMUX 17 apparatus is based on the controllability of its transfer matrix. In the event of choosing a value of τ sufficiently small (for example half of the bit period of the input signal) and having a sufficiently large number N of stages (4 stages, for example) the device is capable of approximating the reverse transfer matrix of the fibre in the region of the spectrum occupied by the signal.

In this manner the two output signals are essentially an (approximate) reproduction of the signals transmitted.

Figure 5:
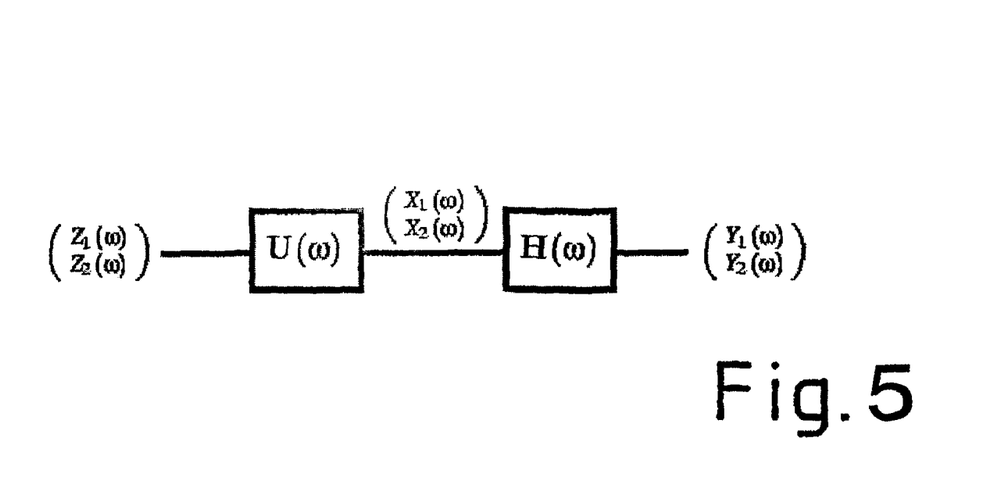
FIG. 5 is a block diagram of the transfer functions to which the signals are subjected in the system of FIG. 1.

With reference to the block diagram of FIG. 5 the vectors:

$$\begin{pmatrix} Z_1(\omega) \\ Z_2(\omega) \end{pmatrix}, \begin{pmatrix} X_1(\omega) \\ X_2(\omega) \end{pmatrix}, \begin{pmatrix} Y_1(\omega) \\ Y_2(\omega) \end{pmatrix} \quad (7)$$

respectively represent in the frequency domain the pair of signals $z_1$ and $z_2$ at the input of the fibre, $x_1$ and $x_2$ at the output of the fibre and $y_1$ and $y_2$ at the output of the DMUX.

Thus the following relationships can be written:

$$\begin{pmatrix} Y_1(\omega) \\ Y_2(\omega) \end{pmatrix} = H(\omega) \begin{pmatrix} X_1(\omega) \\ X_2(\omega) \end{pmatrix} \quad (8)$$

and $$\begin{pmatrix} X_1(\omega) \\ X_2(\omega) \end{pmatrix} = U(\omega) \begin{pmatrix} Z_1(\omega) \\ Z_2(\omega) \end{pmatrix} \quad (9)$$

In equation (9), $U(\omega)$ represents the Jones matrix of the optical fibre 15 and allows for the rotation effects and Polarization Mode Dispersion (PMD) with a reference system which at input is aligned with the axes of the Polarization Beam Combiner (PBC) and at the output to those of the Polarization Beam Splitter (PBS).

In the above event in which the device approximates the reverse transfer matrix we can write:

$$H(\omega) \cong U^{-1}(\omega) \quad (10)$$

and the following relationship then applies $$\begin{pmatrix} Y_1(\omega) \\ Y_2(\omega) \end{pmatrix} = H(\omega)U(\omega) \begin{pmatrix} Z_1(\omega) \\ Z_2(\omega) \end{pmatrix} \cong \begin{pmatrix} Z_1(\omega) \\ Z_2(\omega) \end{pmatrix} \quad (11)$$

From equation (11) the result is that the two signals $y_1$ and $y_2$ at the output of the device 17 are approximately a reproduction of the two transmitted signals $z_1$ and $z_2$. It follows that, photodetecting and sending said signals to the respective receiver 19, the two sequences of received symbols $\hat{a}_1$ and $\hat{a}_2$ are the same as the sequences of transmitted symbols $a_1$ and $a_2$.

Figure 6:
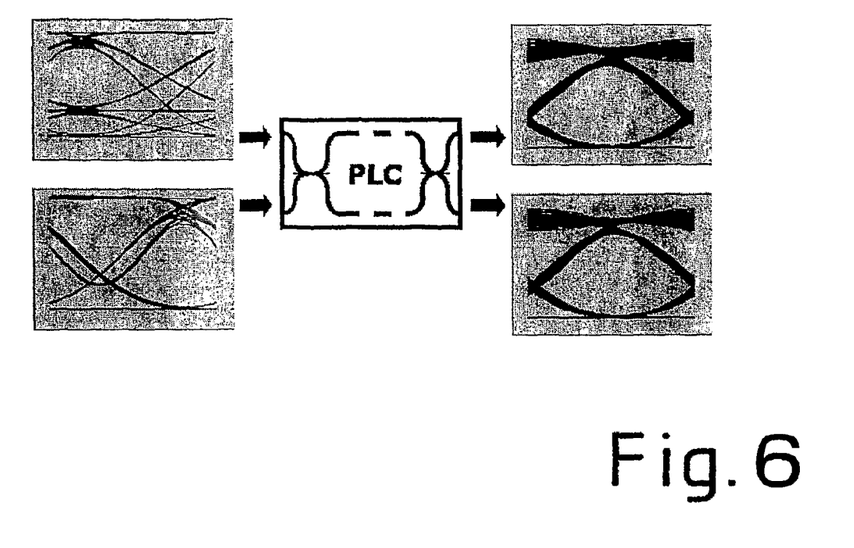
FIG. 6 are two channel eye diagrams before (left hand side) and after (right hand side) filtering by the planar lightguide circuit (PLC)

An example of operation of the DMUX device 17 is shown in FIG. 6, which shows two channel eye diagrams before (left hand side) and after (right hand side) filtering by the DMUX device 17. In FIG. 6 the DMUX device is fabricated in form of a planar lightwave circuit (PLC) and the eye diagrams are for PolMUX transmission over a fibre affected by Polarization Mode Dispersion (PMD). The eye diagrams for both channels are shown at for the input and output of the DMUX. From a comparison of the eye diagrams it is evident that the distortion and mutual interference caused by the PMD are virtually totally eliminated by the DMUX device.

The performance obtainable by means of the transmission system in accordance with the present invention can be given in terms of penalization of the optical-signal to noise ratio (OSNR) and outage probability (OP). A standard On Off Keying OOK system is considered for comparison purposes. OSNR penalization refers to an OOK system in a back-to-back configuration for a $10^{-12}$ Bit Error Rate (BER). OP is the probability that the OSNR penalization will become greater than 3 dB.

Figure 7:
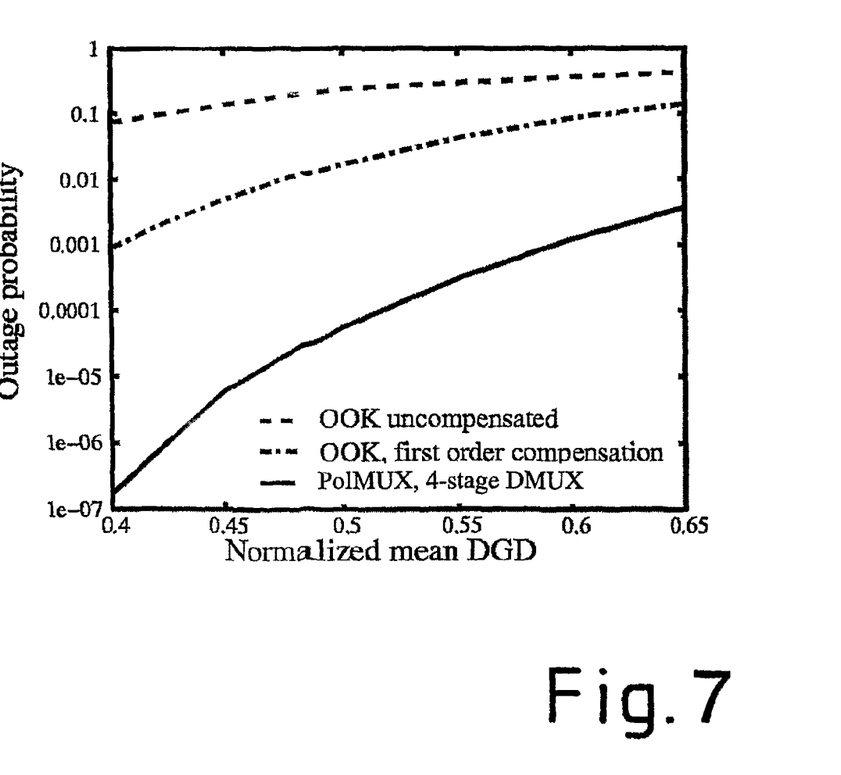
FIG. 7 plots of outage probability versus normalised mean differential group delay (DGD) for the polarisation multiplexing system of the invention compared to an uncompensated on off keying (OOK) and first order compensated OOK systems.

A quantitative estimate of the performance of the system is shown in FIG. 7 showing the outage probability as a function of the mean Differential Group Delay (DGD) of the connection that is a characterizing parameter of the statistical behaviour of a fibre in PMD terms.

In FIG. 7, one of the two channels (they have the same outage probability) of a PolMUX system with 4-stage (N=4) DMUX is compared both with an uncompensated OOK system and with the same OOK system with exact compensation of the PMD of the first order.

As may be seen, the PolMUX channel obtained in accordance with the present invention has decidedly better performance and shows that the device of the present invention is actually capable of demultiplexing the two channels and performing a compensation of the PMD even for orders higher than the first. In particular, the proposed system can operate with mean DGD up to 0.42 $T_b$, keeping the OP below $10^{-6}$. As mentioned above, it is advantageous and preferable in accordance with the present invention that during normal functioning of the system the DMUX device parameters are updated dynamically in such a manner as to follow the temporal variations of the transmission channel which are translated into changes in the fibre transfer matrix.

For this purpose, a feedback signal which is a good indicator of the quality of the signals received, i.e. the corresponding error rate, is used to control the parameters. In the present invention, the feedback signal is advantageously an estimate of the overall Mean Square Error (MSE) on the two signals received $s_1$, $s_2$ (the sum or, equivalently, the mean square value of the MSE of each of the two signals). This is determined by the processing block 21.

Alternatively the DMUX device can advantageously be controlled in response to other feedback signals, such as for example the sum (or mean value) of the openings of the eye diagrams (eye opening).

For the first of the two channels, the Mean Square Error $MSE_1$ is the expected value of the square of the difference between the value of the received signal $s_1(t_i)$, at the generic instant of sampling $t_i$, and the corresponding transmitted symbol $a_{1i}$:

$$MSE_1 = E\{(s_1(t_i) - a_{1i})^2\} \quad (12)$$

Similarly, for the second channel:

$$MSE_2 = E\{(s_2(t_i) - a_{2i})^2\} \quad (13)$$

A good estimate of the two magnitudes can be obtained by substituting in equations (12) and (13) the transmitted symbols $a_{1i}$ and $a_{2i}$ with the corresponding symbols in reception $\hat{a}_{1i}$ and $\hat{a}_{2i}$ and the expected value with an average of a finite number M of samples. In this manner, considering taking the mean value of the MSEs for the two channels, the feedback signal is $$U(t_i) = \frac{1}{2M}\sum_{k=0}^{M-1}[(s_1(t_i - kT_b) - \hat{a}_{1(i-k)})^2 + (s_2(t_i - kT_b) - \hat{a}_{2(i-k)})^2] \quad (14)$$

Considering a value of M sufficiently large, in the case in which the system is functioning correctly and the error rate is consequently very low, U is an excellent approximation of the MSE. In practice, the operations indicated in equation (14) are performed inside the block 21 indicated MSE in FIG. 1 which can be integrated or not in the receiver as will be readily imaginable to those skilled in the art.

Lastly, in control block 20 a minimization algorithm based on the gradient method is advantageously implemented. The Q parameters of the DMUX 17 are continually updated on the basis of this algorithm such as to minimize the feedback signal. To achieve the purpose, various algorithms can be used as will be readily imaginable to those skilled in the art, such as the algorithm of Newton and its derivatives, the algorithm of Levenberg-Marquardt or the random algorithms like 'simulated annealing'.

The details of an advantageous usable algorithm, the manner in which the gradient is estimated and the law with which the parameters are updated are disclosed in our co-pending European patent application EP1456980 (Application No. 02788441.0) the content of which is hereby incorporated by way of reference thereto.

It is now clear that the objectives of the invention have been achieved. The above description of an embodiment applying the innovative principles of the present invention is given by way of non-limiting example of said principles and variations can be made that are within the scope of the invention.

Although in the foregoing description the two signals $a_1$ and $a_2$ are described as being mutually independent, that is they correspond to two distinct communications data streams, they can also be taken as decoding signals (for example multilevel) of a signal to be transmitted. It will be clear to those skilled in the art that in this case the two received signals $\hat{a}_1$ and $\hat{a}_2$ can be used to obtain reverse decoding and recover the transmitted signal.

Equations (10) and (11) are indicative of the fact that the present invention can be used for various alternative modulation formats. Notwithstanding the modulation format used, the vectors defined in (7) can be respectively considered as the Jones representation of the field at the fibre input, the Jones representation of the corresponding field at the fibre output, and the Jones representation of the field at the output of the DMUX assuming that the signals on the two outputs of the DMUX are the two orthogonal polarizations of the same field.

In the case explained above in which the DMUX 17 device is implemented a sequence of Polarization Controllers (PCs) and Polarization Maintaining Fibres (PMFs), this formal artifice is not necessary, since the two outputs of the device being actually made up of the two signal polarizations.

Because of the phenomena described above, distortions present on the field at the fibre output can be such as to not allow correct decoding of the modulation format used. Use of the present invention, allowing reversal of the fibre transfer matrix essentially allows eliminating the harmful effects of the channel by giving back at output a signal approximately identical to the one transmitted even from the viewpoint of the polarization state. In this manner the signal can be correctly decoded.

A practical example of the foregoing is made up for example of the modulation of the polarization state of the signal (known as multilevel PolSK modulation). With this type of modulation the PMD or even a simple polarization rotation are very detrimental. By using the present invention it is possible to compensate for both the polarization rotation effects and the PMD effects by filtering the signal at the fibre output in accordance with the same diagram indicated for the PolMUX and sending the two DMUX outputs to a receiver for the PolSK format such as for example a known Stokes parameter receiver.

In this case the feedback signal is an estimate of the MSE mediated on all the channels associated with the modulation. For example, considering a PolSK eight-level modulation, three different channels are associated with the three Stokes parameters of the optical signal. The MSE is then estimated for each of the three channels received and mediated on them.

Moreover although it is found advantageous to fabricate the DMUX device as a planar lightwave circuit, other devices or series of devices providing an equivalent transfer matrix can be used. For example, it can comprise polarization controllers and polarization maintaining fibres such as described in the above-mentioned European Patent Application number EP1456980 followed by another polarization controller and polarization divider as will readily imaginable to those skilled in the art in the light of the explanations given herein.

As mentioned above, for dynamic control of the device, in the present invention reference is advantageously made to a particular feedback signal, the mean square error MSE, and a particular minimization algorithm the gradient algorithm. Other feedback signal capable of monitoring the quality of the two channels received as well as another minimization or maximization algorithm can be used.

The invention claimed is:

1. A transmission system comprising:
an optical fiber;
a pair of transmitters configured to transmit respectively produced optical signals over the optical fiber, the optical signals being transmitted at the same wavelength and having orthogonal states of polarization; and
a receiver configured to:
receive the respectively produced optical signals from the optical fiber;
filter two components of the received signal having the orthogonal states of polarization based on a transfer matrix $H(\omega)$ that is dynamically controlled responsive to two output signals to approximate a reverse transfer matrix of the optical fiber in a region of the spectrum occupied by the received signal to compensate for a polarization mode dispersion and a polarization rotation introduced by the optical fiber;
eliminate distortion and mutual interference effects for both the respectively produced optical signals;
obtain an approximate repetition of the respectively produced optical signals at an output of the receiver; and
wherein the transfer matrix $H(\omega)$ is:

$$H(\omega) = e^{-j\frac{N}{2}\omega\tau}\begin{pmatrix} C(\omega) & D(\omega) \\ -D*(\omega) & C*(\omega) \end{pmatrix}$$

and wherein the two functions $C(\omega)$ and $D(\omega)$ are given by:

$$C(\omega) = \sum_{k=0}^{N} c_k e^{-j(k-N/2)\omega\tau}$$

$$D(\omega) = \sum_{k=0}^{N} d_k e^{-j(k-N/2)\omega\tau}$$

with $|C(\omega)|^2 + |D(\omega)|^2 = 1$ and where $\tau$ is an appropriate temporal delay, and $c_k$ and $d_k$ are complex coefficients that are dynamically controlled based on the two output signals.

2. The system of claim 1 wherein the receiver comprises:
a polarization splitter disposed at an input of the receiver, the polarization splitter configured to divide the received signal into the two components based on their polarization; and
a demultiplexing device configured to filter the two components to approximate the reverse transfer matrix of the optical fiber.

3. The system of claim 2 further comprising a photodetector configured to receive the two components from the demultiplexing device after filtering, and to output two corresponding signals to clock and data recovery circuits.

4. The system of claim 2 wherein parameters of the demultiplexing device are dynamically controlled to minimize a predetermined cost function.

5. The system of claim 4 wherein the predetermined cost function comprises a function of the sum of the mean square errors for the two output signals.

6. The system of claim 4 wherein the predetermined cost function comprises a function of the sum of the openings of the rough diagrams for the two output signals.

7. The system of claim 2 wherein the demultiplexing device comprises a cascade of polarization controllers (PCs) and polarization maintaining fibers (PMFs).

8. A transmission system comprising:
an optical fiber;
a pair of transmitters configured to transmit respectively produced optical signals over the optical fiber, the optical signals being transmitted at the same wavelength and having orthogonal states of polarization;
a receiver configured to;
receive the respectively produced optical signals from the optical fiber;
filter two components of the received signal having the orthogonal states of polarization based on a transfer matrix $H(\omega)$ that is dynamically controlled responsive to two output signals to approximate a reverse transfer matrix of the optical fiber in a region of the spectrum occupied by the received signal to compensate for a polarization mode dispersion and a polarization rotation introduced by the optical fiber;
eliminate distortion and mutual interference effects for both the respectively produced optical signals;
obtain an approximate repetition of the respectively produced optical signals at an output of the receiver;
the receiver comprising:
a polarization splitter disposed at an input of the receiver, the polarization splitter configured to divide the received signal into the two components based on their polarization; and
a demultiplexing device configured to filter the two components to approximate the reverse transfer matrix of the optical fiber;
wherein the demultiplexing device comprises a planar lightguide circuit comprising a cascade of N identical elements, each element comprising:
an interferometrical structure having a delay $\tau$ between two optical paths;
a phase modulator controlled by a parameter $\phi_n$; and
a first variable coupler controlled by the parameter $\theta_n$.

9. The system of claim 8 wherein the demultiplexing device further comprises a second variable coupler $\theta_n$ disposed at an input of the demultiplexing device.

10. The system of claim 9 wherein an overall transfer matrix of the device is:

$$H(\omega) = \left[\prod_{n=N}^{1}(H_{\theta_n}H_{\Phi_n}H_\tau(\omega))\right]H_{\theta_0}.$$

11. The system of claim 10 wherein the overall transfer matrix comprises a frequency dependent unitary transfer matrix defined by:

$$H(\omega) = e^{-j\frac{N}{2}\omega\tau}\begin{pmatrix} C(\omega) & D(\omega) \\ -D*(\omega) & C*(\omega) \end{pmatrix}$$

$|C(\omega)|^2 + |D(\omega)|^2 = 1$ and wherein the two functions $C(\omega)$ and $D(\omega)$ are represented by their Fourier series expansion (N+1 terms):

$$C(\omega) = \sum_{k=0}^{N} c_k e^{-j(k-N/2)\omega\tau}$$

and $$D(\omega) = \sum_{k=0}^{N} d_k e^{-j(k-N/2)\omega\tau}$$

where $c_k$ and $d_k$ are complex coefficients that are linked unlinearly to real control parameters of the demultiplexing device.

12. The system of claim 8 wherein at least some of the N elements of the demultiplexing device comprises one or more additional phase modulators and one or more additional variable couplers.

13. The system of claim 8 wherein each of the N elements of the demultiplexing device comprises one or more additional phase modulators and one or more additional variable couplers.

14. A receiver configured to receive a polarization multiplexed optical signal transmitted over a single fiber, the polarization multiplexed optical signal comprising two polarization multiplexed signals respectively produced by two transmitters, and to perform simultaneous compensation of polarization mode dispersion and demultiplexing of the polarization multiplexed signals, the receiver comprising:
a demultiplexeing device configured to:
filter two components of the polarization multiplexed optical signal having orthogonal polarization based on a transfer matrix $H(\omega)$ that is dynamically controlled responsive to two output signals to approximate a reverse transfer matrix of the optical fiber in a region of the spectrum occupied by the polarization multiplexed signals to compensate for a polarization mode dispersion and a polarization rotation introduced by the optical fiber;

eliminate effects of distortion and mutual interference for both the polarization multiplexed signals;

obtain an approximate repetition of the two polarization multiplexed signals at an output of the receiver;

wherein the transfer matrix $H(\omega)$ comprises:

$$H(\omega) = e^{-j\frac{N}{2}\omega\tau}\begin{pmatrix} C(\omega) & D(\omega) \\ -D*(\omega) & C*(\omega) \end{pmatrix}$$

and wherein the two functions $C(\omega)$ and $D(\omega)$ are represented by their Fourier series expansion (N+1 terms):

$$C(\omega) = \sum_{k=0}^{N} c_k e^{-j(k-N/2)\omega\tau}$$

and $$D(\omega) = \sum_{k=0}^{N} d_k e^{-j(k-N/2)\omega\tau}$$

with $|C(\omega)|^2 |D(\omega)|^2 = 1$ where $\tau$ is a temporal delay, an $c_k$ and $d_k$ are the complex coefficients controlled dynamically on the basis of the two output signals.

15. The receiver of claim 14 further comprising an input polarization splitter configured to divide the received signal into the two components based on the polarization.

16. The receiver of claim 15 further comprising a photodetector configured to:
receive the two components from the demultiplexing device after filtering; and
send the two output signals to clock and data recovery circuits.

17. The receiver of claim 15 wherein parameters for the demultiplexing device are dynamically controlled to minimize a predetermined cost function.

18. The receiver of claim 17 wherein the predetermined cost function comprises a function of the sum of the mean square errors for the two output signals.

19. The receiver of claim 17 wherein the predetermined cost function comprises a function of the sum of the openings of the rough diagrams for the two output signals.

20. The receiver of claim 15 wherein the demultiplexing device comprises a cascade of polarization controllers (PCs) and polarization maintaining fibers (PMFs).

21. A receiver configured to receive a polarization multiplexed optical signal transmitted over a single fiber, the polarization multiplexed optical signal comprising two polarization multiplexed signals respectively produced by two transmitters, and to perform simultaneous compensation of polarization mode dispersion and demultiplexing of the polarization multiplexed signals, the receiver comprising:

a demultiplexing device configured to:
filter two components of the polarization multiplexed optical signal having orthogonal polarization based on a transfer matrix $H(\omega)$ that is dynamically controlled responsive to two output signals to approximate a reverse transfer matrix of the optical fiber in a region of the spectrum occupied by the polarization multiplexed signals to compensate for a polarization mode dispersion and a polarization rotation introduced by the optical fiber;

eliminate effects of distortion and mutual interference for both the polarization multiplexed signals; and obtain an approximate repetition of the two polarization multiplexed signals at an output of the receiver;

an input polarization splitter configured to divide the received signal into the two components based on the polarization;

wherein the demultiplexing device comprises a planar lightguide circuit having a cascade of N identical elements, each element comprising:
an interferometrical structure having a delay $\tau$ between two optical paths;
a phase modulator controlled by a parameter $\phi_n$; and
a first variable coupler controlled by a parameter $\theta_n$.

22. The receiver of claim 21 further comprising a second variable coupler $\theta_n$ disposed at an input of the demultiplexing device.

23. The receiver of claim 21 wherein at least some of the N elements of the demultiplexing device comprise one or more additional phase modulators and variable couplers.

24. The receiver of claim 21 wherein all of the N elements of the demultiplexing device comprise one or more additional phase modulators and variable couplers.

25. The receiver of claim 21 wherein an overall transfer matrix of the device is $$H(\omega) = \left[\prod_{n=N}^{1} (H_{\theta_n} H_{\Phi_n} H_\tau(\omega))\right] H_{\theta_0}.$$

26. The receiver of claim 25 wherein the overall transfer matrix comprises a frequency dependent unitary transfer matrix defined by:

$$H(\omega) = e^{-j\frac{N}{2}\omega\tau}\begin{pmatrix} C(\omega) & D(\omega) \\ -D*(\omega) & C*(\omega) \end{pmatrix}$$

$|C(\omega)|^2 + |D(\omega)|^2 = 1$ wherein the two functions $C(\omega)$ and $D(\omega)$ are represented by their Fourier series expansion (N+1 terms):

$$C(\omega) = \sum_{k=0}^{N} c_k e^{-j(k-N/2)\omega\tau}$$

and $$D(\omega) = \sum_{k=0}^{N} d_k e^{-j(k-N/2)\omega\tau}$$

where $c_k$ and $d_k$ are complex coefficients that are linked unlinearly to real control parameters of the demultiplexing device.

27. A method of receiving two optical signals from the same optical fiber, which have been transmitted at the same wavelength and with orthogonal polarization, the method comprising:

receiving the two optical signals over the optical fiber;

filtering two components of the received signal having the orthogonal states of polarization based on a transfer matrix $H(\omega)$ that is dynamically controlled responsive to two output signals to approximate a reverse transfer matrix of the optical fiber in a region of the spectrum occupied by the received signal to compensate for a polarization mode dispersion and a polarization rotation introduced by the optical fiber;

eliminating distortion and mutual interference effects for the two optical signals;

transmitting an approximate repetition of the two optical signals obtained at an output of the receiver; and wherein the transfer matrix $H(\omega)$ is:

$$H(\omega) = e^{-j\frac{N}{2}\omega\tau} \begin{pmatrix} C(\omega) & D(\omega) \\ -D*(\omega) & C*(\omega) \end{pmatrix}$$

wherein the two functions $C(\omega)$ and $D(\omega)$ are represented by their Fourier series expansion (N+1 terms):

$$C(\omega) = \sum_{k=0}^{N} c_k e^{-j(k-N/2)\omega\tau}$$

and $$D(\omega) = \sum_{k=0}^{N} d_k e^{-j(k-N/2)\omega\tau}$$

with $$|C(\omega)|^2 |D(\omega)|^2 = 1$$

where $\tau$ is an appropriate temporal delay, and $c_k$ and $d_k$ are complex coefficients that are dynamically controlled based on the output signals.

\* \* \* \* \*

UNITED STATES PATENT AND TRADEMARK OFFICE
CERTIFICATE OF CORRECTION

PATENT NO. : 7,873,282 B2
APPLICATION NO. : 10/598718
DATED : January 18, 2011
INVENTOR(S) : Secondini et al.

It is certified that error appears in the above-identified patent and that said Letters Patent is hereby corrected as shown below:

On the Title Page, in Field (54), under Title, in Column 1, Line 2, delete "DISPENSION" and insert -- DISPERSION --, therefor.

In Column 1, Line 2, delete "DISPENSION" and insert -- DISPERSION --, therefor.

In Column 3, Line 24, delete "DMUX-will" and insert -- DMUX will --, therefor.

In Column 3, Line 32, delete "DMIUX" and insert -- DMUX --, therefor.

In Column 8, Line 30, delete "algorithm the" and insert -- algorithm, the --, therefor.

In Column 10, Line 63, in Claim 14, delete "demultiplexeing" and insert -- demultiplexing --, therefor.

In Column 11, Line 33, in Claim 14, delete "an $c_k$" and insert -- and $c_k$ --, therefor.

In Column 14, Line 15, in Claim 27, delete " $|C(\omega)|^2 |D(\omega)|^2 = 1$ " and insert -- $|C(\omega)|^2 + |D(\omega)|^2 = 1$ --, therefor.

Signed and Sealed this
Seventh Day of June, 2011

David J. Kappos
*Director of the United States Patent and Trademark Office*